United States Patent
Sedlack

(10) Patent No.: US 6,611,887 B2
(45) Date of Patent: Aug. 26, 2003

(54) ASSEMBLY METHOD AND SYSTEM FOR COMPUTER PERIPHERAL DEVICES

(75) Inventor: Derek J. Sedlack, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 407 days.

(21) Appl. No.: 09/740,222

(22) Filed: Dec. 19, 2000

(65) Prior Publication Data

US 2002/0116557 A1 Aug. 22, 2002

(51) Int. Cl.[7] .......................... G06F 13/12; G06F 13/38
(52) U.S. Cl. ................. 710/62; 710/8; 710/15; 700/110; 700/116
(58) Field of Search ................. 710/8, 10, 11, 710/15, 16, 19, 33, 37, 62, 64; 709/246, 321; 700/110, 116

(56) References Cited

U.S. PATENT DOCUMENTS

| 5,465,346 A | 11/1995 | Parks et al. |
|---|---|---|
| 5,727,208 A | 3/1998 | Brown |
| 5,862,369 A | 1/1999 | Parks et al. |
| 2001/0004734 A1 * | 6/2001 | Kudoh et al. ............... 705/26 |
| 2002/0073148 A1 * | 6/2002 | Haines et al. ............ 709/204 |
| 2002/0080381 A1 * | 6/2002 | Haines ...................... 358/1.14 |

FOREIGN PATENT DOCUMENTS

JP 406019727 A * 1/1994 ........... G06F/11/00

* cited by examiner

*Primary Examiner*—Jeffrey Gaffin
*Assistant Examiner*—Angel Casiano
(74) *Attorney, Agent, or Firm*—Haynes and Boone, L.L.P.

(57) ABSTRACT

A system and method are provided for checking a computer with a peripheral device installed in one of a plurality of slots. The method can be performed by software running in the computer and/or software running in a separate computer. The method starts by receiving a purchase order for the computer. The purchase order designates the peripheral device and specifies one of the slots in the computer for receiving the peripheral device. A first software routine is used for locating the slot in which the peripheral device was installed. The slot located by the software routine is then compared with the specified slot from the purchase order. If the located slot is not the same as the specified slot, the method automatically provides a first message indicating that the peripheral device should be moved from the located slot to the specified slot.

20 Claims, 3 Drawing Sheets

ASSEMBLY METHOD AND SYSTEM FOR COMPUTER PERIPHERAL DEVICES

BACKGROUND

The disclosures herein relate generally to computers and, more particularly, to an assembly system and method for monitoring the installation of peripheral devices in a computer.

Most computers have a layered bus architecture for supporting the various components that comprise or interface with the computer. For example, a personal computer typically includes a local bus for connecting high speed devices, such as a microprocessor and cache memory. Connected to the local bus through a bus interface is often one or more peripheral buses, for connecting disk drives and the like. In many instances, both internal and external peripheral buses, such as a small computer systems interface or a universal serial bus, exist in a variety of configurations.

One purpose of the peripheral buses is to provide ports for peripheral devices such as storage devices, modems, joysticks, keyboards, pointer devices, modems, and network cards. A port represents an electrical bus interface, and is typically associated with a physical interface, called a slot. In a broad sense, slots and ports can be considered part of the bus that it is interfacing. Therefore, the terms "bus", "slots", and "port" are, in many instances, interchangeable. Because the peripheral devices are selectively connected to slots (either directly or through another bus), the devices are often attached by users or computer assemblers with little or no regard for a desired placement of each device. As a result, problems sometimes result from undesired slot/device arrangements.

For example, a purchaser with many computers may desire a specific slot arrangement for peripheral devices (e.g., a modem is desired in "slot 1", and a network card is desired in "slot 2"). By having such a specific arrangement, the purchaser can have a consistent computer configuration for each computer. This may help in general maintenance of the computers, or may be a necessity required by physical restraints. In furtherance of the present example, "slot 3" is often difficult to access by a computer technician, and the purchaser does not want slot 3 used, if at all possible.

Therefore, the purchaser may order a computer and designate the desired arrangement for the peripheral devices. However, the manufacturer/assembler assembling the computer may not follow the desired arrangement. This can happen for several reasons, the most prevalent being human error. In general, many computer purchasers do not care which slot (for a particular bus) peripheral devices are installed in because slots for a particular bus are typically interchangeable. Therefore, the computer assembler can place the modem (for example) in any slot of the desired bus. The computer will be operational and functional whether the modem is in slot 1, slot 2 or slot 3, and the computer will therefore pass any electrical and/or functional inspection.

However, the purchaser will encounter difficulties or errors because the modem is not in the slot that they requested. As a result, the purchaser will either go to the expense of re-installing the device in the desired slot, or will contact the computer assembler concerning the error. As a result, an extra cost is incurred that could have been avoided.

Not only is extra cost incurred, but the reputation of the assembler is diminished for failing to exactly meet the order placed by the purchaser. Therefore, what is needed is a system and method for checking that the peripheral device is indeed installed in the proper slot before it is shipped to the purchaser.

In another example, it is sometimes difficult for a computer assembler/manufacturer to provide a proper combination of peripheral devices and computer software. For example, many modems, even by the same modem manufacturer, will have different software drivers. It is important that the computer assembler provide the proper software driver for the modem installed. This can be difficult if the modem changes revisions, or the software changes revisions, or both. A newly revised modem may be available for assembly before the software driver is readily available to be downloaded to the computer. Also, certain combinations of peripheral devices may require additional or different software drivers. Therefore, what is needed is a system and method for monitoring the peripheral devices and determining if other hardware or software components are needed.

SUMMARY

One embodiment, accordingly, provides a system and method for checking a computer with a peripheral device installed in one of a plurality of slots. The method can be performed by software running in the computer and/or software running in a separate computer. The method starts by receiving a purchase order for the computer. The purchase order designates the peripheral device and specifies one of the slots in the computer for receiving the peripheral device. A first software routine is used for locating the slot in which the peripheral device was installed. The slot located by the software routine is then compared with the specified slot from the purchase order. If the located slot is not the same as the specified slot, the method automatically provides a first message indicating that the peripheral device should be moved from the located slot to the specified slot.

A principal advantage of this embodiment is that the computer will be checked for proper assembly at the assembly location. As a result, the corrections of any assembly errors can be performed by the assembler, which is more cost efficient than performing a correction at another facility. Also, the purchaser receives the computer exactly as requested, which enhances the purchaser's buying experience. Furthermore, by providing an accurate customized assembly service, the assembler may receive increased financial benefit.

DETAILED DESCRIPTION

Figure 1:
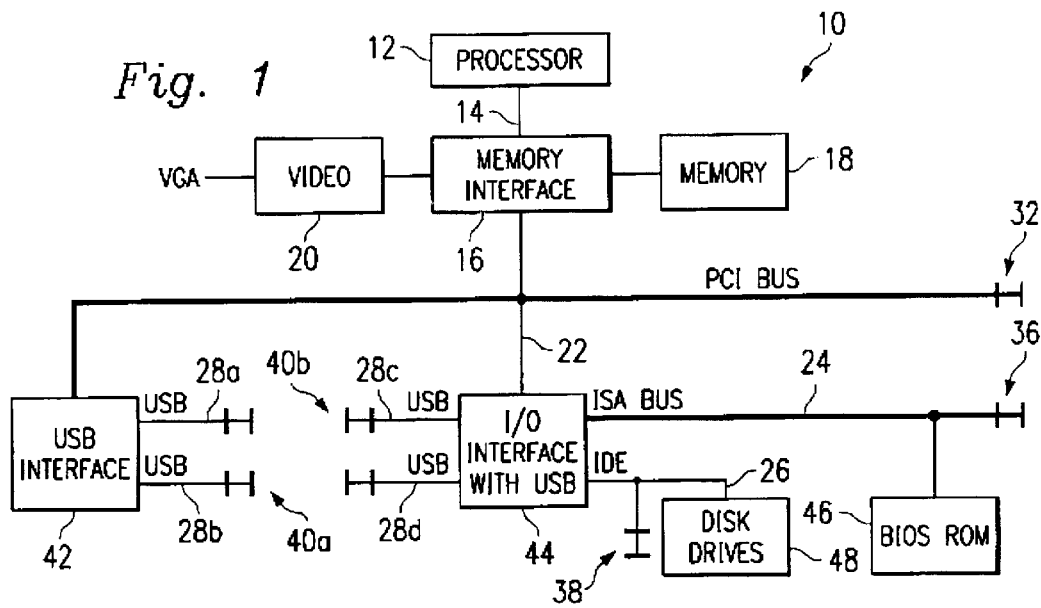
FIG. 1 is a block diagram of one embodiment of a computer including several different buses and bus interfaces.

Referring to FIG. 1, the reference numeral 10 designates, in general, a computer for implementing several different embodiments. The computer 10 is illustrated with many different components, it being understood that various components may be used by some embodiments and not by other embodiments. Actual component types are also discussed for the sake of example, it being further understood that a wide variety of substitution is expected for different embodiments.

The computer 10 includes a processor 12, which may for example be one capable of supporting an operating system such as Windows 98 from Microsoft Corporation of Redmond, Wash. The processor 12 connects to a local bus 14 for accessing one or more components, including a memory interface 16 for accessing a main memory 18 and a video card 20 for driving a video device (not shown). The memory interface 16 interconnects the local bus 14 with one or more peripheral buses, such as a peripheral component interconnect ("PCI") bus 22, an industry standard architecture ("ISA") bus 24, an integrated drive electronics ("IDE") bus 26, and a universal serial bus ("USB") 28a, 28b, 28c, 28d.

The PCI bus 22 connects to one or more peripheral devices through one or more PCI ports 32. Examples of PCI peripheral devices include a network interface card and a modem. Similarly, the ISA bus 24 connects to one or more peripheral devices through one or more ISA ports 36. Furthermore, the IDE bus 26 also connects to one or more peripheral devices through one or more IDE ports 38.

Further still, the USBs 28a, 28b, and 28c, 28d may connect to any number of components through one or more USB ports 40a and 40b, respectively.

The USBs 28a, 28b connect with the PCI bus 22 through an interface 42. In the present example, the interface 42 is a serial bus peripheral controller. Likewise, the USBs 28c, 28d connect with the PCI bus 22 through an input/output ("I/O") interface 44. In the present example, the interface 44 is an I/O Peripheral Controller from Intel, Corp. of Santa Clara, Calif. The interface 44 performs the same USB controller functions as the interface 42, but also performs many other I/O functions such as interfacing the PCI bus 22 to the IDE bus 26 and ISA bus 24. The USBs 28a, 28b, 28c, 28d described herein may alternatively be described as intermediate ports. This is because the USBs 28a, 28b, 28c, 28d do not necessarily connect to any devices, but instead are used to connect the controllers 42, 44 to the ports 40a–40d.

Additional devices may also connect to any or all of the aforementioned buses. For example, a storage of basic input/output system ("BIOS") code 46 may be connected to the ISA bus 24. A hard disk drive 48 may be connected to the IDE bus 26. Furthermore, additional or alternative bus types can be used in the computer 10. For example, a small computer system interface ("SCSI") bus may be used, as is well known in the art.

Therefore, the computer 10 includes many different slots 32, 36, 38, 40a, and 40b for receiving various peripheral devices. Examples of such devices include network interface cards, modem cards, disk drives, and sound cards. Some or all of the peripheral devices may further require a software driver which may be stored, for example, in the memory 18.

Figure 2:
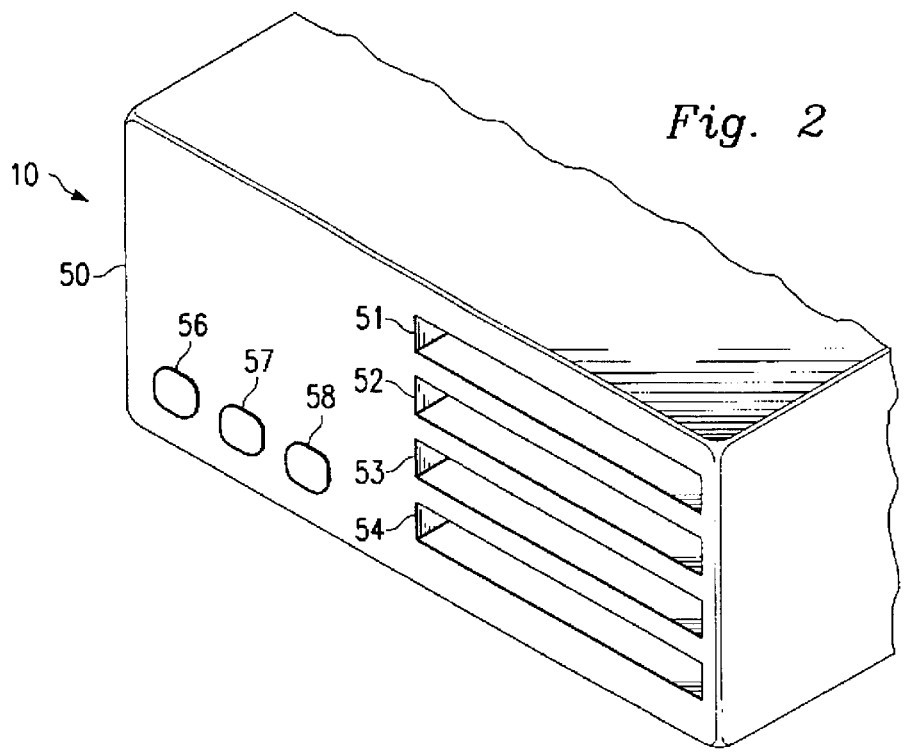
FIG. 2 illustrates a back panel of the computer of FIG. 1, including a plurality of slots for receiving peripheral devices.

Referring to FIG. 2, the computer 10 also includes a back cover 50. The back cover 50 includes a plurality of apertures for providing various connections to the various buses and components discussed in FIG. 1. For the sake of further example, the computer 10 includes four PCI slots 51, 52, 53, 54 accessible through the back cover 50. The PCI slots 51–54 provide the electrical/mechanical interface to the ports 32 of the PCI bus 22. The PCI slots 51–54 include necessary hardware components for securing the installed peripheral device, as are well known in the art. The computer 10 may also include additional slots 56, 57, 58 for other ports, such as those discussed above with reference to FIG. 1.

Figure 3A:
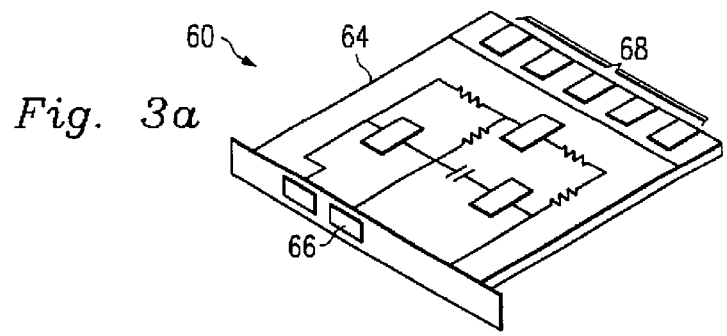
FIGS. 3a and 3b illustrate exemplary peripheral devices that can be installed in the slots of FIG. 2.
Figure 3B:
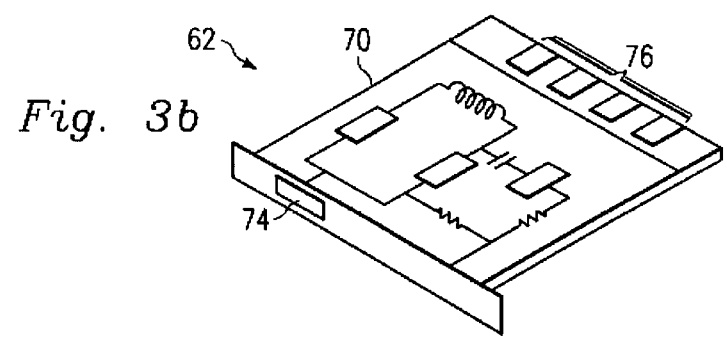

Referring also to FIGS. 3a and 3b, in furtherance of the present example, it is desired to install a modem card 60 and a network card 62 into two of the PCI slots shown in FIG. 2. Both cards 60, 62 are PCI compliant, meaning that they can interface with the PCI bus 22. The modem card 60 includes electronic circuitry 64, external connectors 66, and a bus connector 68 for facilitating electrical connection with the PCI bus 22 of FIG. 1. Likewise, the network card 62 includes electronic circuitry 70, external connectors 74, and a bus connector 76 for facilitating electrical connection with the PCI bus 22. The electronic circuits 64, 70 each include an identifier that can be used by the computer 10 for various reasons. The identifier includes a product identification (e.g., indicating a modem or a network card), a manufacturer identification (brand), a model number, and a revision number. With the information stored in the identifier, the operating system running in the computer 10 can properly identify the devices 60, 62 and load any software drivers that are needed. It is understood, however, that some peripheral devices will have different types of electronic circuits and/or identifiers, and some may have no identifiers.

It is understood that the modem card 60 and the network card 62 can be inserted into any of the slots 51–54. Once inserted, the computer 10, including the cards 60, 62, will "pass" all electrical and functional tests, and be ready for delivery to the purchaser. However, in the present example, the purchaser for the computer 10 has requested that the modem card 60 be placed in slot 54 and the network card 62 be placed in slot 53. Furthermore, the purchaser has requested that the modem card 60 be of a brand W, model X, and the network card 62 be of a brand Y, model Z. Therefore, the purchaser provides the instructions in the form of a purchase order, a portion of which is described in Table 1, below.

TABLE 1

| PCI Slot | Peripheral Device |
|---|---|
| Slot 51 | None |
| Slot 52 | None |
| Slot 53 | Modem card, Brand W, Model X |
| Slot 54 | Network card, Brand Y, Model Z |

Figure 4:
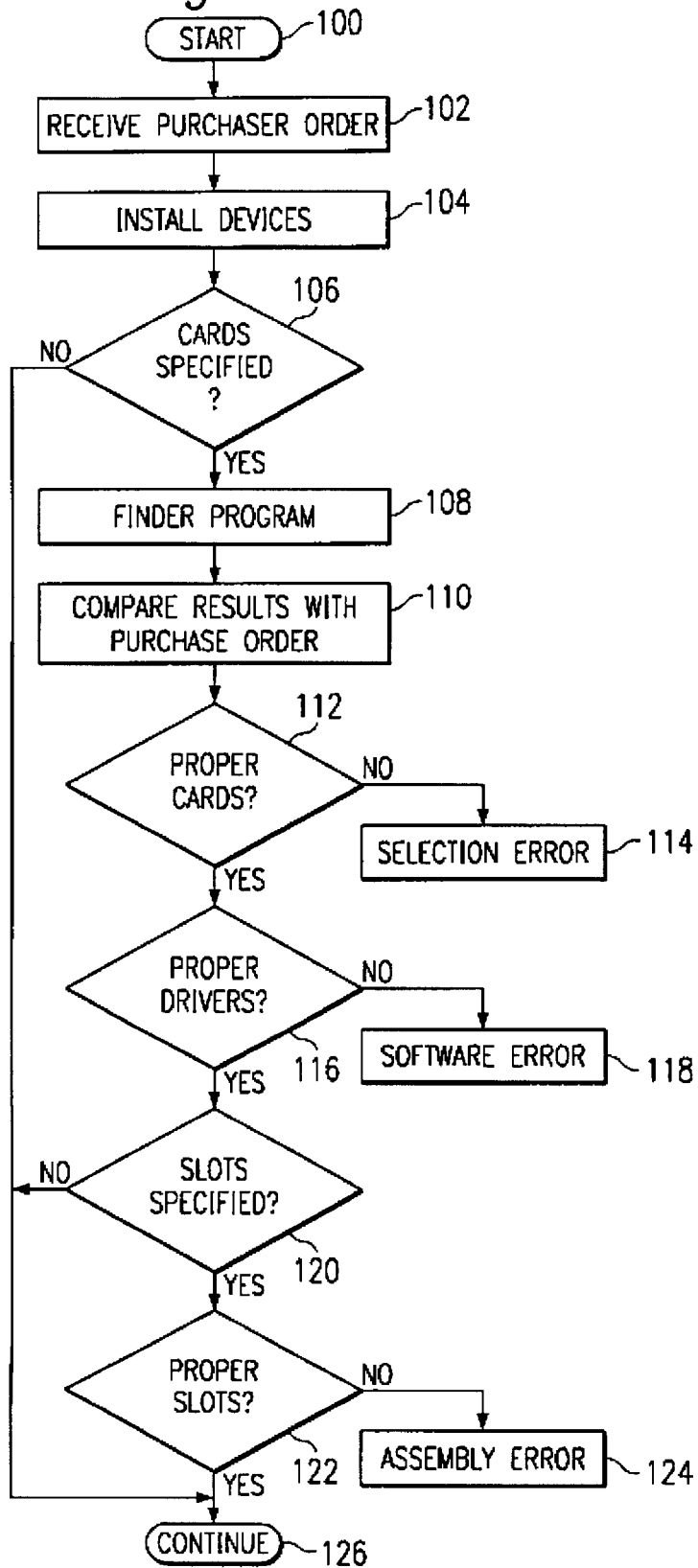
FIG. 4 is a flowchart illustrating an embodiment of a method for monitoring the assembly of peripheral devices into one or more slots of a computer.

Referring now to FIG. 4, a manufacturing/assembly method 100 can be used to build/assemble the computer 10 responsive to any requests from the purchaser. Execution begins at step 102, where a purchase order is received. The purchase order is likely to have many specifications, including a particular processor 12, a particular memory 18, a particular disk drive 26, and so forth. However, for the present disclosure, the purchase order will be represented by Table 1, above.

At step 104, an installation process for the computer 10 begins, including installing the modem card 60 and network card 62 into two of the PCI slots. In the present example, the purchaser has not only specified which peripheral devices to install, but the slot in which they should be installed. It is understood, however, that while many purchasers often request specific peripheral devices, most purchasers do not designate specific slots for the devices. Therefore, it often becomes "routine" in the assembly process to install the peripheral devices in any available slots (slots 51, 52 in the present example).

At step 106, a determination is made as to whether the purchaser has requested peripheral devices. This determination can be made by examining the purchase order (Table 1). If so, execution proceeds to step 108 where a Finder program is executed. The Finder program is a software tool that runs on the computer 10 (in the present embodiment). The Finder program queries the buses of the computer 10, including the PCI bus 22, for peripheral devices. The Finder program can retrieve the identifier for each peripheral device (if available) and can also identify in which slot the peripheral device is installed. For the sake of example, the Finder program may produce results, such as in Table 2, below.

TABLE 2

| PCI Slot | Peripheral Device |
|---|---|
| Slot 51 | None |
| Slot 52 | Modem card, Brand A, Model B, Rev 1.1 |
| Slot 53 | None |
| Slot 54 | Network card, Brand Y, Model Z, Rev 1.0 |

At step 110, the results of the Finder program (Table 2) are compared with the purchase order (Table 1). At step 112, a determination is made as to whether the proper peripheral devices have been installed. In the present example, the network card, Brand Y, Model Z is one of the proper cards. However, the Finder program detected that the modem card is a Brand A, Model B. This is not the same type of modem card as requested in the purchase order. As a result, execution proceeds to step 114 where a peripheral device selection error is reported and handled accordingly. To continue with the example, the Brand A, Model B modem card is replaced with the desired Brand W, Model X, Rev 1.2.

If at step 112 it is determined that the proper peripheral devices have been installed, execution proceeds to step 116 where a determination is made as to whether the computer 10 includes the proper software for the installed peripheral devices. As stated above, software can be different for different devices, models, and brands. Furthermore, software for a particular device/brand/model frequently changes (often associated with a revision number). For the sake of example, the software provided with the computer 10 includes drivers for peripheral devices shown in Table 3, below.

TABLE 3

| Peripheral Device | Revisions |
|---|---|
| Modem card, Brand A, Model B | Rev 1.0–1.1 |
| Modem card, Brand W, Model X | Rev 1.0–2.0 |
| Network card, Brand Y, Model Z | Rev 1.0 |

If at step 116 the software has not been provided to the computer 10 (or is not scheduled for future provision), execution proceeds to step 118 where a peripheral device software error is reported and handled accordingly. In the present example, both the network card (Brand Y, Model Z, Rev 1.0) and the modem card (Brand W, Model X, Rev 1.2) are supported by the necessary software.

Upon a determination at step 116 that the proper peripheral devices and software are provided, execution proceeds to step 120. At step 120, a determination is made as to whether the user has specified specific slots for the peripheral devices. If so (as in the present example of Table 1), execution proceeds to step 122 where the results of the Finder program (Table 2) are further compared with the purchase order (Table 1). If the peripheral devices are not in the specified slots, execution proceeds to step 124 where a peripheral device assembly error is reported and handled accordingly. In the present example, the network card 62 is in the specified slot, but the modem card needs to be moved to slot 53.

If the computer 10 has the peripheral devices properly installed, with the proper software, or if no peripheral devices are requested, execution proceeds to step 126 where the assembly process may continue. Otherwise, execution returns to step 104 until the computer 10 is properly assembled.

Figure 5:
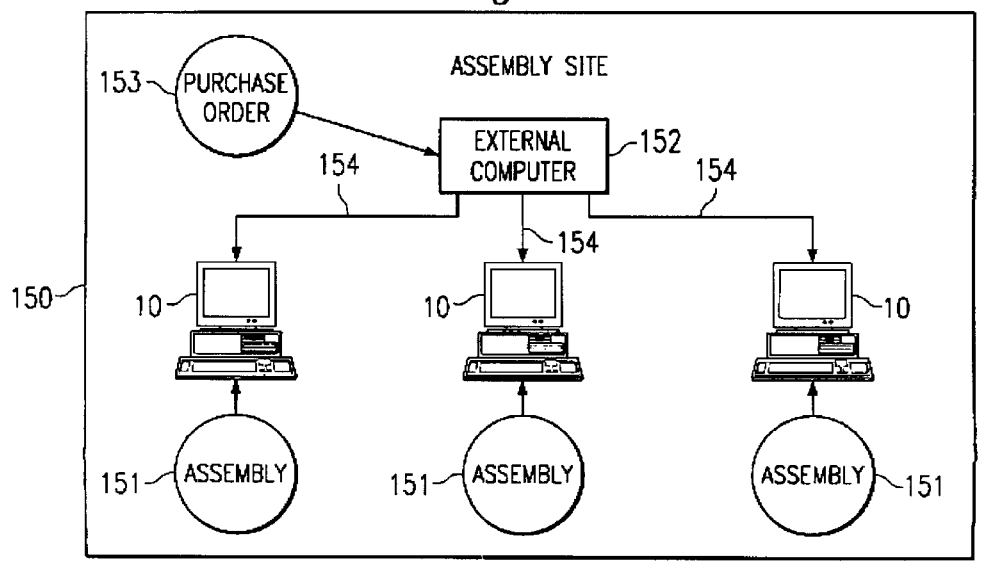
FIG. 5 is a block diagram illustrating an embodiment of an assembly site with an assembly computer for performing the method of FIG. 4 on one or more computers.

Referring to FIG. 5, a manufacturing/assembly site 150 can include a manufacturing computer 152 for facilitating the assembly of the computer 10, as well as several additional computers. The site 150 includes assembly stations 151 for assembling each computer 10, the assembly stations being operated as automatic mechanical systems, by one or more people, or combinations thereof. In one embodiment, the manufacturing computer 152 receives the purchase order 153 and provides information from the purchase order as well as software for implementing the method 100 (including the Finder program) to the computers 10 through an interface 154. The software can then be stored on and performed by each computer 10, using the processor 12 and the memory 18, respectively. In another embodiment, the method 100 (or certain steps thereof) can be stored on and performed by the manufacturing computer 152. The method 100 can even be performed simultaneously on several computers 10 being assembled. In this way, software for the method 100 and the Finder program does not need to be loaded or removed from any storage of the computer 10.

As a result, the computer 10 will be assembled as specified by the purchaser. This provides many benefits. One benefit is that the correction of any assembly errors can be performed by the assembler, which is more cost efficient than performing a correction at the purchaser's facility. Another benefit is that the purchaser receives the computer 10 exactly as requested, which enhances the purchaser's buying experience. Yet another benefit is that the assembler can continue to provide this customized service, which may be of financial benefit to the assembler.

Although illustrative embodiments have been shown and described, a wide range of modification, change and substitution is contemplated in the foregoing disclosure and in some instances, some features of the embodiment may be employed without a corresponding use of other features. For example, instead of specifically identifying which peripheral devices are to be installed in which slots, the purchase order may simply state that no peripheral devices are to be installed in one or more slots. Accordingly, it is appropriate that the appended claims be construed broadly and in a manner consistent with the scope of the embodiments disclosed herein.

What is claimed is:

1. A method for checking a computer with a peripheral device installed in one of a plurality of slots, the method comprising:

receiving a purchase order for the computer, the purchase order designating the peripheral device and specifying one of the plurality of slots for receiving the peripheral device;

running a software routine for locating the slot in which the peripheral device was installed;

comparing the slot located by the software routine with the specified slot from the purchase order; and if the located slot is not the same as the specified slot, automatically providing a first message indicating that the peripheral device should be moved from the located slot to the specified slot.

2. The method of claim 1 wherein the software routine further provides a product identification for the peripheral device, the method further comprising:

comparing the product identification for the peripheral device with driver software for the computer to determine if the peripheral device is supported by the driver software; and if the peripheral device is not supported by the driver software, automatically providing a second message indicating that there is no support.

3. The method of claim 1 wherein the purchase order provides a product identification for the peripheral device and the software routine provides a product identification for the peripheral device, the method further comprising:

comparing the product identification from the software routine with the product identification from the purchase order; and if the product identifications do not match, automatically providing a second message indicating that there is no match.

4. The method of claim 1 wherein the slots serve a peripheral component interconnect ("PCI") bus, and the peripheral device is PCI compliant.

5. The method of claim 2 wherein the product identification includes a model revision for the peripheral device, and the comparing the product identification includes matching the model revision with a list of revisions supported by the driver software.

6. The method of claim 1 wherein the purchase order specifies a plurality of acceptable slots, and the comparing the slot determines if the slot located by the software routine is one of the acceptable slots.

7. A manufacturing system for checking a computer with a peripheral device installed in one of a plurality of slots, comprising:

a first software routine for locating the slot in which the peripheral device was installed; and a second software routine for receiving a purchase order for the computer;

the purchase order including a designation of the peripheral device and a designation of one slot in the computer for receiving the peripheral device, for comparing the slot located by the first software routine with the specified slot from the purchase order, and for automatically providing a first message indicating that the peripheral device should be moved from the located slot to the specified slot if the located slot is not the same as the specified slot.

8. The manufacturing system of claim 7 wherein:

the first software routine is also for determining a product identification for the peripheral device; and the second software routine is also for comparing the product identification for the peripheral device with driver software for the computer to determine if the peripheral device is supported by the driver software, and if not, automatically providing a second message indicating that there is no support.

9. The manufacturing system of claim 7 wherein:

the purchase order also includes a product identification for the peripheral device;

the first software routine is also for retrieving a product identification from the peripheral device; and the second software routine is also for comparing the product identification retrieved by the first software routine with the product identification from the purchase order, and if the two product identifications do not match, automatically providing a second message indicating that there is no match.

10. The manufacturing system of claim 7 further comprising:

a manufacturing computer for performing the first and second software routines.

11. The manufacturing system of claim 10 wherein the manufacturing computer simultaneously performs the first and second software routines on a plurality of computers.

12. The manufacturing system of claim 7 further comprising:

a manufacturing computer for providing the purchase order and the first and second software routines to the computer for implementing the first and second software routines.

13. A software program for use by a manufacturing system to check assembly of a computer, the computer having a plurality of slots with a plurality of installed peripheral devices, the software program comprising instructions for:

receiving a purchase order for the computer, the purchase order specifying slots in the computer for receiving each of the plurality of peripheral devices;

locating the slots in which each peripheral device was installed;

comparing the located slots with the specified slots from the purchase order; and if the located slots are not the same as the specified slots, automatically providing a first message indicating that one or more of the peripheral devices should be installed in a different slot.

14. The software program of claim 13 further comprising instructions for:

receiving product identifications for each of the peripheral devices;

reviewing driver software designated for the computer;

determining if the peripheral devices are supported by the driver software; and if any peripheral device is not supported by the driver software, automatically providing a second message indicating the lack of support.

15. The software program of claim 14 wherein the product identification includes a model revision for the peripheral device, and the comparing the product identifications includes matching the model revision with a list of revisions supported by the driver software.

16. The software program of claim 13 wherein the instructions for locating the slots are stored as a separate routine.

17. The software program of claim 13 wherein the purchase order provides product identification for the peripheral devices, the software program further comprising instructions for:

retrieving a product identification for each peripheral device;

comparing the retrieved product identification with the product identification from the purchase order; and if the two product identifications do not match, automatically providing a second message so indicating.

18. A system for verifying proper assembly of a computer with a plurality of slots and at least one peripheral device installed therein, the system comprising:

means for receiving a purchase order for the computer, the purchase order designating at least one peripheral device and specifying one of a plurality of slots in the computer for receiving the peripheral device;

a software routine for locating the slot in which the peripheral device is installed;

means for comparing the slot located by the software routine with the specified slot from the purchase order; and an alarm for indicating that the peripheral device should be moved from the located slot to the specified slot, if the located slot is not the same as the specified slot.

19. The system of claim 18 wherein the purchase order provides a first product identification for the peripheral device and the software routine is capable of retrieving a second product identification from the peripheral device, the system further comprising:

means for comparing the first and second product identifications to determine if the peripheral device is supported by the driver software; and the alarm also for indicating the lack of support if the peripheral device is not supported by the driver software.

20. The system of claim 18 further comprising:

means for identifying a support code for a device driver for the computer;

means for retrieving a product code for the peripheral device;

means for comparing the support code with the product code; and the alarm also for indicating the lack of support by the driver software if the product code is not represented by the support code.

* * * * *